United States Patent

[11] 3,539,006

| [72] | Inventors | Edward C. Hanna<br>Strongsville;<br>Warren E. Beutler, Willoughby Hills;<br>Henry C. Pajak, Parma, Ohio |
|---|---|---|
| [21] | Appl. No. | 731,205 |
| [22] | Filed | May 22, 1968 |
| [45] | Patented | Nov. 10, 1970 |
| [73] | Assignee | The Lamson & Sessions Co.<br>Cleveland, Ohio<br>a corporation of Ohio |

[54] METHOD AND APPARATUS FOR INSPECTING ANNULAR ARTICLES
36 Claims, 13 Drawing Figs.

[52] U.S. Cl. .................................................. 209/73;
198/19, 198/221; 209/75, 209/80, 209/88,
209/111.8, 324/37, 324/40
[51] Int. Cl. ........................................................ B07c 3/12,
B07c 5/06
[50] Field of Search .......................................... 198/19,
221; 324/37, 40; 209/73, 75, 80—82, 88, 111.8

[56] References Cited
UNITED STATES PATENTS

| 2,933,180 | 4/1960 | Dixon.......................... | 198/221 |
| 2,989,179 | 6/1961 | Woods ........................ | 209/81X |
| 3,422,542 | 1/1969 | Spurr........................... | 209/80X |

Primary Examiner—Richard A. Schacher
Attorney—Yount, Flynn and Tarolli

ABSTRACT: In the present invention, metal nuts or similar annular articles are advanced intermittently to successive inspection stations, each followed by a reject station. Two of the inspection stations have eddy current scanners which respectively scan the end faces of the article. At another inspection station the opening in the article is probed to determine whether it is of the proper size throughout and is properly screw-threaded. The reject mechanism at each reject station is controlled by the scanner or probes at the immediately preceding station after the time delay involved in advancing the article from the inspection station to the reject station. The articles are advanced from one station to the next by a cam-operated transfer plate which has a cyclic, rectangular path of movement which leaves the articles stationary for most of each cycle Patented Nov. 10, 1970

INVENTORS
EDWARD C. HANNA,
WARREN E. BEUTLER,
& HENRY C. PAJAK
BY YOUNT, FLYNN, & TAROLLI

ATTORNEYS

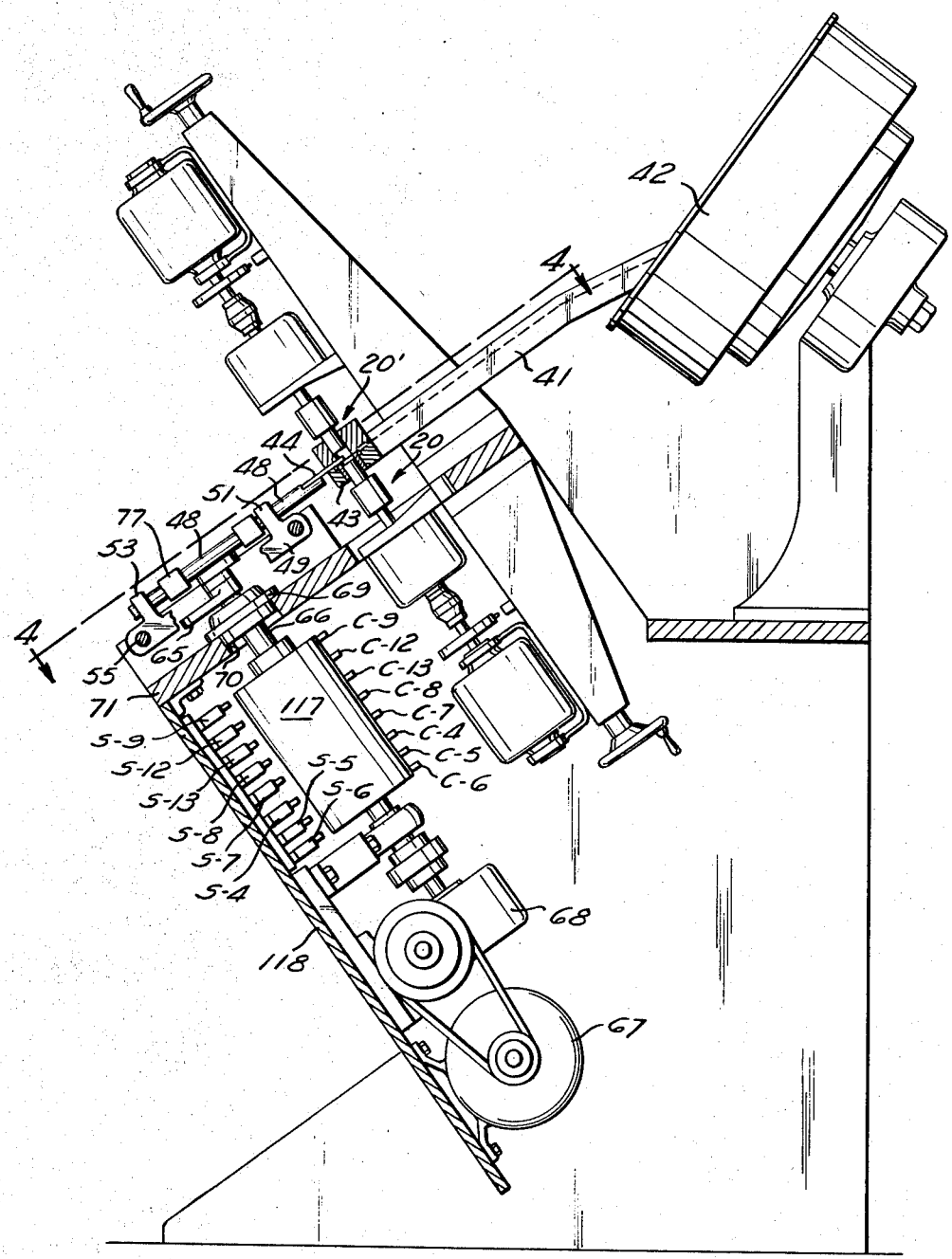
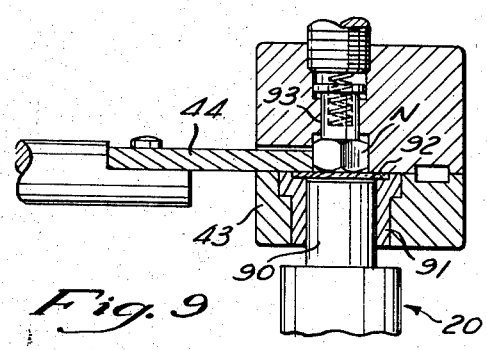
Fig. 3
Fig. 9
INVENTORS
EDWARD C. HANNA,
WARREN E. BEUTLER,
& HENRY C. PAJAK
BY YOUNT, FLYNN, & TAROLLI
ATTORNEYS Patented Nov. 10, 1970
3,539,006
Sheet 3 of 5
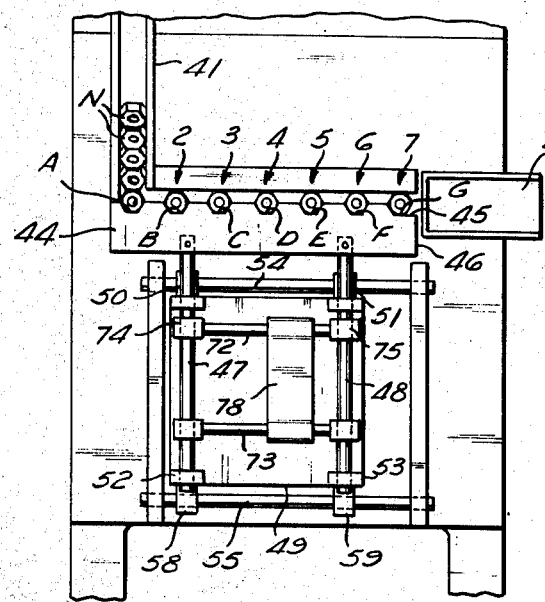
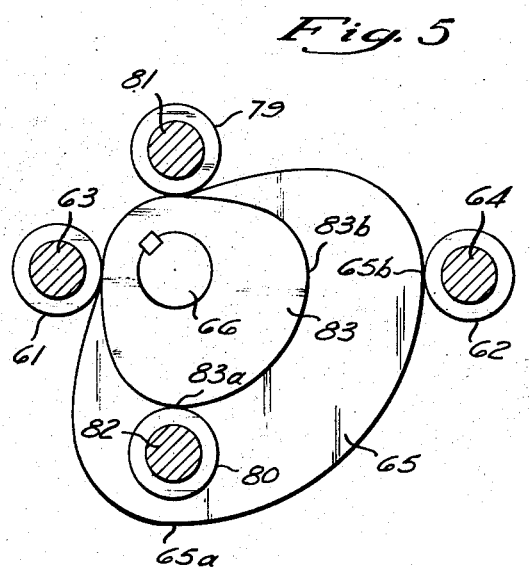
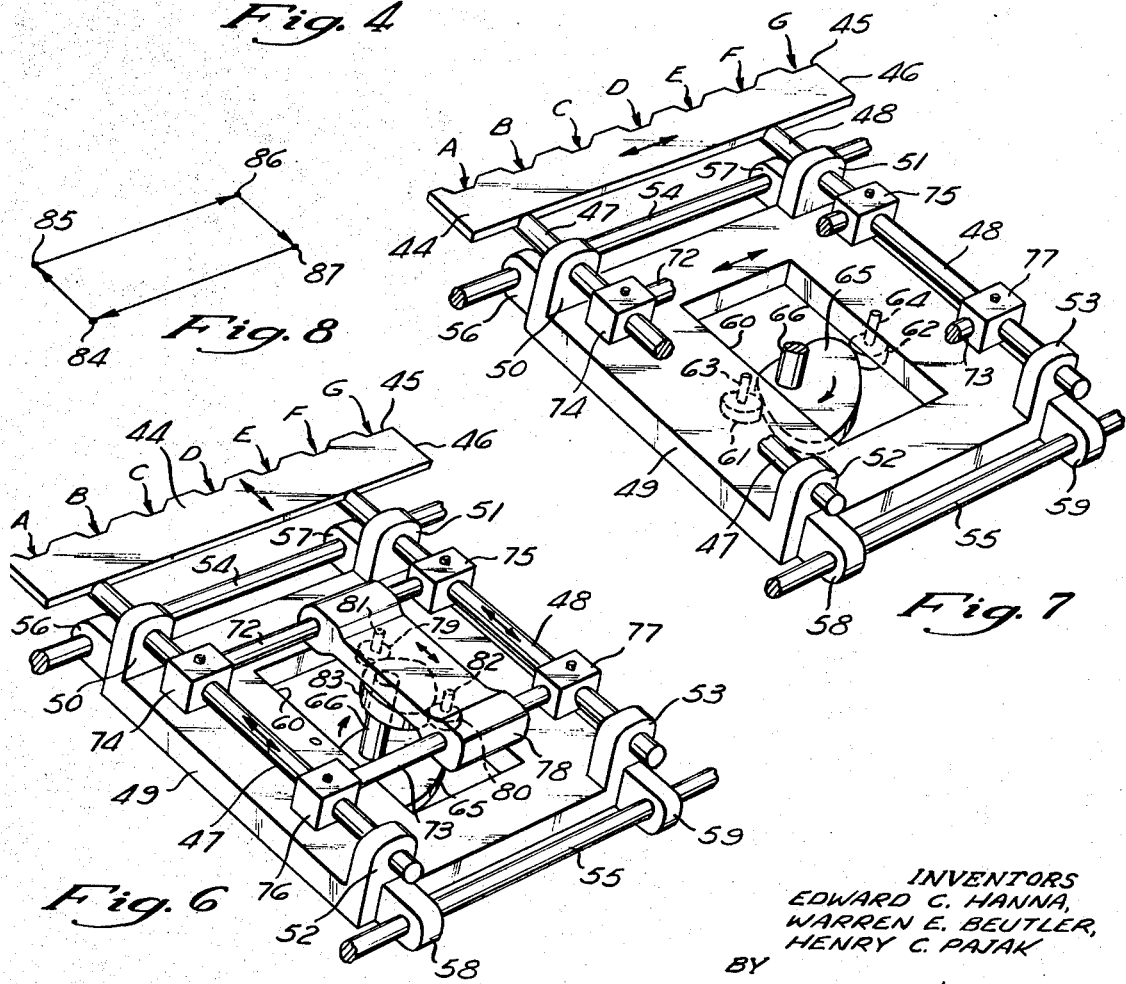
INVENTORS
EDWARD C. HANNA,
WARREN E. BEUTLER,
HENRY C. PAJAK
BY
YOUNT, FLYNN, & TAROLLI
ATTORNEYS Patented Nov. 10, 1970
3,539,006
Sheet 4 of 5
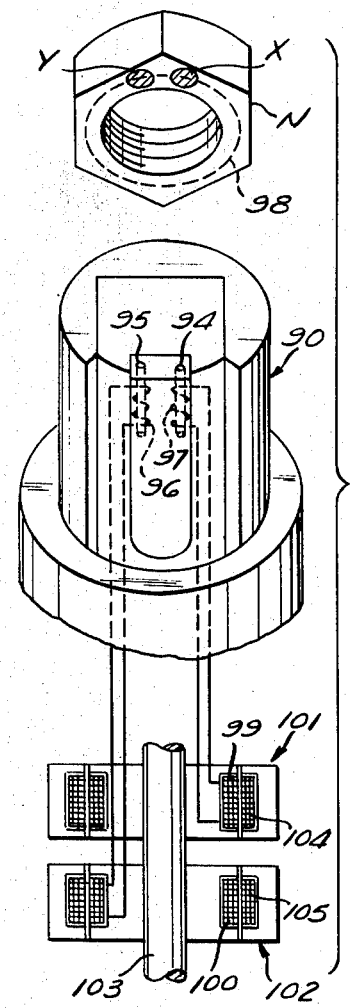
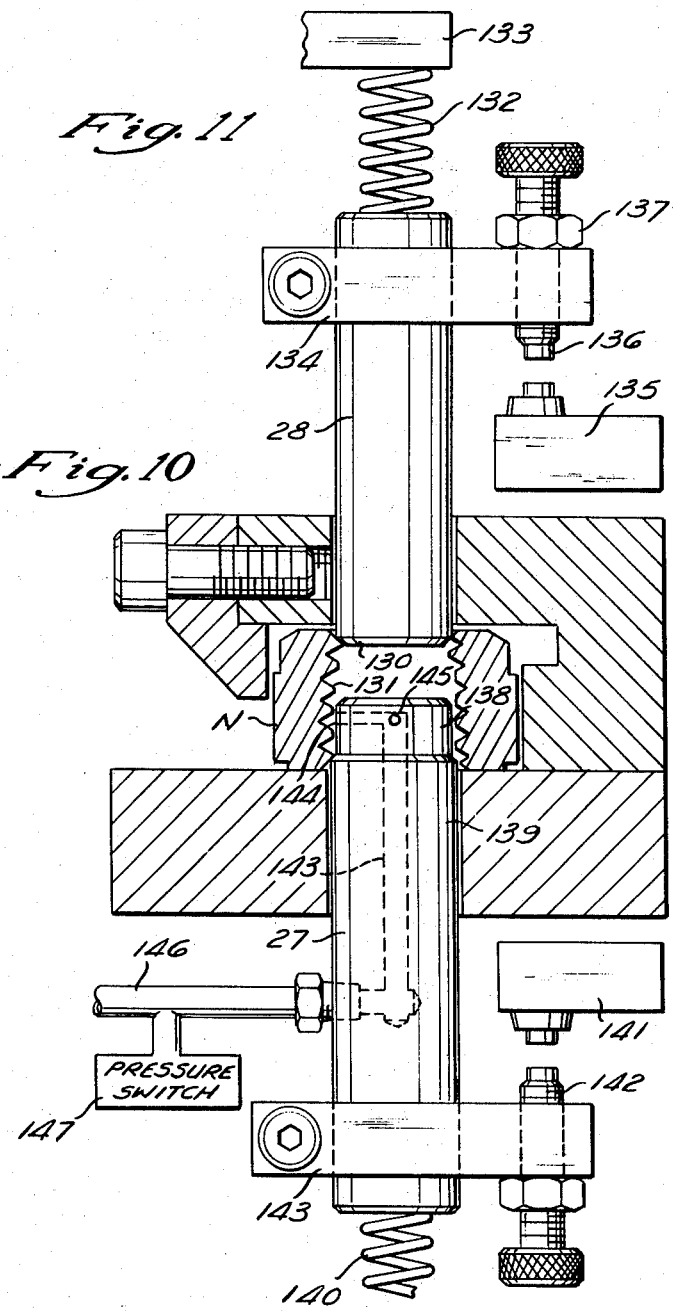
INVENTORS
EDWARD C. HANNA,
WARREN E. BEUTLER,
& HENRY C. PAJAK
BY YOUNT, FLYNN, & TAROLLI
ATTORNEYS

METHOD AND APPARATUS FOR INSPECTING ANNULAR ARTICLES

This invention relates to a method and an apparatus for inspecting electrically-conductive annular articles, such as metal nuts or the like.

Various methods and machines have been proposed heretofore for the nondestructive testing of defects in various metal articles, such as bars, tubes, magnetic cores, bearing races and bearing balls. Commonly, such prior arrangements require that the article under inspection be moved either longitudinally or rotationally while it is being scanned by an inspection probe, or else that the inspection probe be rotated around the circumference of the article. None of these prior arrangements is efficiently suited for the high speed inspection of annular electrically-conductive articles, such as nuts or the like, because of the inaccuracies which can occur because of the movement of the article during scanning and/or the excessive time required to complete the inspection of the article.

The present invention is directed to a novel method and apparatus which overcomes these disadvantages and enables the rapid and accurate nondestructive testing of such articles in a novel and advantageous manner.

In the presently-preferred complete embodiment of the present invention, the articles are advanced intermittently to successive inspection stations, each followed by a reject station. Two of the inspection stations have eddy current scanners which respectively scan opposite end faces of each article. At another inspection station a pair of plug gauge probes determine the dimensional accuracy of the opening in the article and the presence of a screw-threaded groove in the wall of this opening. Each reject station has a reject mechanism operable under the control of the scanner or probes in the immediately preceding inspection station so as to reject an article which was found to be defective in that inspection station. If the article is not found to be defective in any particular inspection station, the immediately following reject mechanism will not be operated and the article will then be transferred to the next inspection station. The transfer mechanism in the present apparatus has article-receiving recesses which are spaced apart in accordance with the spacing between successive stations, so that it transfers several articles simultaneously between successive stations. The transfer mechanism has a rectangular cycle of movement which enables the articles to be stably positioned at rest in the different stations for much more than half of each cycle, during which time the inspection and rejection operations can be carried out in a reliable manner, with the inspection and reject mechanisms being disabled substantially only during the small fraction of each cycle when the articles are being advanced to the next stations.

It is a principal object of this invention to provide a novel and improved method of inspecting electrically-conductive annular articles by successively scanning the opposite end faces of each article with eddy current scanners while the article is stationary.

Another object of this invention is to provide such a method in which the article is transferred to a reject station immediately after being scanned and is either accepted or rejected there, depending upon whether a flaw was detected in it in the preceding scanning operation.

Another principal object of this invention is to provide a novel and improved apparatus for inspecting electrically-conductive annular articles by eddy current scanning the article in one station and then transferring it immediately to a reject station in which it is either accepted or rejected, depending upon whether a flaw was detected in it by the preceding eddy current scanning operation.

Another object of this invention is to provide such an apparatus in which the opposite end faces of the article are scanned individually in respective inspection stations, each followed by a respective reject station in which the article is either accepted or rejected.

Another object of this invention is to provide such an inspection apparatus having a novel and improved arrangement for intermittently advancing the articles individually in succession, from one station to the next, through the successive inspection and reject stations.

Another object of this invention is to provide an inspection apparatus having a novel and improved arrangement for performing different inspection operations at different inspection stations, each followed by acceptance or rejection of the article in the following station, together with a novel transfer mechanism for advancing the articles through the successive stations at high speed in a manner which minimizes the time during which the inspection and acceptance or rejection operations are not being performed.

Another object of this invention is to provide a novel and improved inspection apparatus for annular articles in which the article is probed to detect dimensional defects or the absence of a screw-threaded groove at the opening in the article.

Further objects and advantages of this invention will be apparent from the following detailed description of a presently-preferred embodiment thereof, which is illustrated in the accompanying drawings.

In the drawings:

FIG. 3 is a right end elevational view of this apparatus, with certain parts broken away for clarity;

FIG. 4 is a view taken along the line 4–4 in FIG. 3, looking down on the apparatus;

FIG. 5 is an enlarged top plan view showing the cams and cam followers in the article-transfer mechanism of the present apparatus;

FIG. 6 is a top perspective view of this transfer mechanism;

FIG. 7 is a view similar to FIG. 6, but with certain parts broken away to reveal other parts which are hidden in FIG. 6;

FIG. 8 is a view illustrating the rectangular cycle of movement of the transfer plate in the present transfer mechanism;

FIG. 9 is a cross section through the first eddy current scanning inspection station in the present apparatus;

FIG. 10 is an enlarged exploded perspective view showing the rotary eddy current probe in relation to the article which it scans in the first inspection station;

FIG. 11 is a cross section taken through the mechanical probe station in the present apparatus;

GENERAL OPERATION

Figure 1:
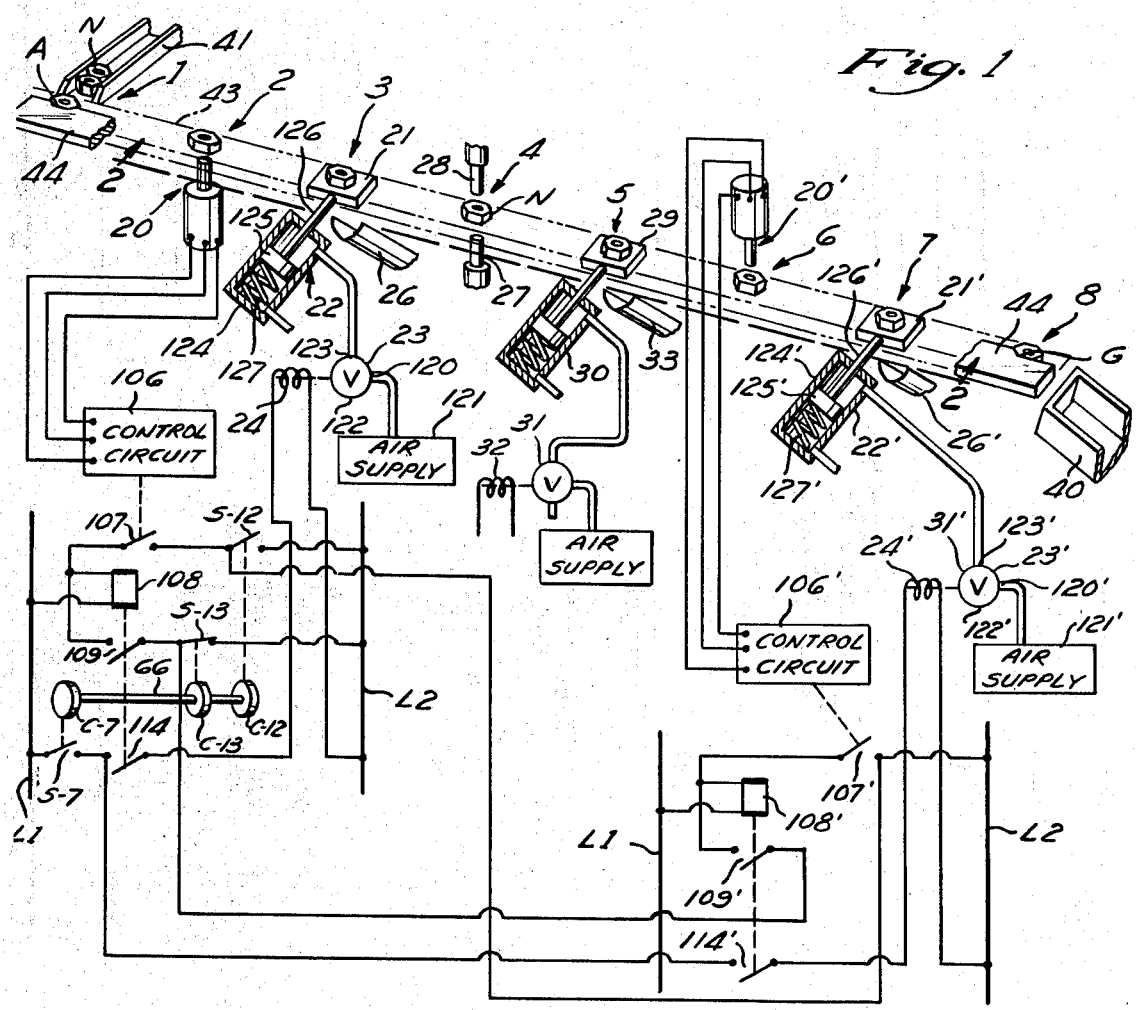
FIG. 1 is a schematic perspective view showing the successive stations in the present apparatus.

Referring to FIG. 1, in accordance with the presently-preferred embodiment of the present invention, the nut or other annular article to be inspected is advanced intermittently by a transfer mechanism (later described in detail) through a series of inspection stations, where different inspection operations are performed automatically, and through corresponding reject stations, one immediately following each inspection station. If, in any inspection station, a defect is found in the article it is discharged into a reject chute at the next reject station. However, if in any inspection station a defect is not found, the article, when advanced to the next reject station, is not rejected there but instead is maintained in a position to be advanced to the next inspection station. The articles which pass through the successive inspection stations and are found to be defect-free are discharged into an accept chute located after the final reject station.

In FIG. 1 the different stations of the machine are identified as follows:

1. article entry station;
2. first eddy current scanning inspection station;
3. first reject station;

4. mechanical probe inspection station;
5. second reject station;
6. second eddy current scanning inspection station;
7. third reject station;
8. accepted article discharge station.

In the first eddy current scanning inspection station 2, an eddy current scanner 20 scans the bottom end face of the article to detect the presence of cracks or other flaws in the article at or near this bottom end face.

At the immediately following first reject station 3, the article rests on a reciprocable trap door or shutter 21 operated by an air cylinder and piston unit 22 controlled by a solenoid valve 23. The solenoid 24 of this valve is connected to suitable electrical circuitry which, after a time delay, responds to the output signal from the eddy current scanner 20 at the first inspection station 2, such that the trap door 21 is actuated to drop the article into a reject chute 26 if the scanner 20 had sensed a flaw in this article at station 2. If not, the trap door 21 is not actuated and this article is then advanced to the next inspection station 4 in the next cycle of movement of the transfer mechanism.

At the mechanical probe station 4, a pair of probes 27 and 28 are arranged to move into the central opening in the nut or other article from below and above. The lower probe 27 is arranged to detect any of the following defects in the article:

a. absence of a threaded groove in the wall of the opening in the article (i.e., the omission of tapping); and
b. an oversized opening, such as might have been caused by reaming or stripping-out of the screw thread at the opening during tapping.

The upper probe 28 is arranged to detect defect b above or the omission of a sufficient reduction of the thread diameter at the upper end of the opening, which provides a locking effect in a lock-nut.

At the immediately following second reject station 5 the article rests on a reciprocable trap door 29 operated by an air cylinder and piston unit 30 under the control of a solenoid valve 31. The solenoid 32 of this valve is controlled by a circuit shown in detail in FIG. 12, such that the article will be discharged into a reject chute 33 at station 5 if one or more defects in this article were sensed by the probes 27 and 28 in the immediately preceding inspection station 4. If no such defects were detected, the trap door 29 holds the article stationary until the transfer mechanism advances it to the next inspection station 6.

In the second eddy current scanning inspection station 6, an eddy current scanner 20' scans the top end face of the article to detect the presence of cracks or other flaws in the article at or near this end face.

At the immediately following third reject station 7 the article rests on a reciprocable trap door 21' operated by an air cylinder and piston unit 22' controlled by a solenoid valve 23'. The solenoid 24' of this valve is connected to suitable circuitry which, after a time delay, responds to the output signal from the eddy current scanner 20' at station 6, such that the trap door 21' will be actuated to drop the article into a reject chute 26' if the scanner 20' had sensed a flaw in this same article. If no flaws were detected in this article at station 6, the trap door 21' will remain stationary, holding the article in position to be advanced to the right by the transfer mechanism in its next cycle of movement.

Finally, any article which has survived all the inspection operations is pushed off into an accept chute 40 at station 8.

The transfer mechanism which advances the articles intermittently through the successive stations is described in detail with reference to FIGS. 4—8. Briefly, this transfer mechanism includes a transfer plate having seven article-receiving pockets which are spaced apart in accordance with the spacing between the successive stations 1—8. A cam-operated mechanism imparts a rectangular cycle of movement to this transfer plate so that, after engaging an article, it moves the article (from left to right) from one station to the next. Then the transfer plate is retracted away from the articles, then it is returned one station to the left, and then it is moved into engagement with the articles before moving them from left to right again. In the operation of this transfer mechanism, the articles are at rest in the inspection and reject stations for approximately 70 percent of the time during each cycle, which gives enough time for the different inspection operations to be properly performed even though the articles are advanced intermittently through the inspection apparatus at a relatively fast rate.

ARTICLE TRANSFER MECHANISM

Referring to FIG. 3, the present apparatus has a downwardly inclined supply chute or guideway 41 down which the articles to be inspected slide by gravity from a hopper 42. In the drawings, these articles are shown as hexagonal nuts, although it is to be understood that the apparatus may, by slight modification, be adapted to handle square nuts or other types of annular articles. As shown in FIGS. 1 and 4, the nuts in the supply chute are arranged end to end, with the flat lower side edge of one nut engaging the flat upper side edge of the next nut down.

The nut emerging from the lower end of the supply chute 41 comes onto an inclined stationary shelf 43 (FIG. 2), which extends laterally through all of the successive machine stations 1—8, as shown in phantom in FIG. 1. The aforementioned transfer plate 44 of the transfer mechanism is intermittently moved to a position overlying the shelf 43, as indicated in FIG. 1, and then is moved from left to right along the shelf to advance the nuts from one station to the next.

As best seen in FIGS. 6 and 7, the transfer plate 44 has a series of seven notches A through G in its front edge for receiving successive nuts. The first six notches A through F are each semihexagonal in outline for snugly receiving the lower half of a respective hexagonal nut. The final notch G in the transfer plate 44 has just two sides, arranged at 120° to each other and with the bottom edge 45 extending over to the adjacent end edge 46 of the transfer plate. These notches A through G are spaced apart in succession by the same amount as the spacings between successive machine stations 1—8.

Referring to FIG. 6, the transfer plate 44 is rigidly attached to a pair of spaced parallel, upwardly-inclined rods 47 and 48, which are carried by a horizontal slide assembly that includes a slide block 49. For convenience of description, this slide block 49 will be referred to as the "horizontal" slide block because it controls the horizontal (station-to-station) displacement of the transfer plate 44. However, it will be understood that the slide block 49 actually extends at the same nonhorizontal angle of inclination as the shelf 43 and the transfer plate 44. The horizontal slide block 49 is generally rectangular in outline and it has four upstanding, integral corner posts 50, 51, 52 and 53 which slidably receive the rods 47 and 48 that carry the transfer plate 44. Preferably, each corner post 50, 51, 52 and 53 on the horizontal slide block 49 carries antifriction bearings (not shown) to facilitate the longitudinal sliding movement of the rods 47 and 48 with respect to the slide block 49.

A pair of front and rear horizontal guide rods 54 and 55, which are fixedly supported by the frame of the machine, support the horizontal slide block 49 for movement laterally of the machine. The horizontal slide block 49 has a pair of laterally spaced, integral projections 56 and 57 at its front end for receiving the front guide rod 54, and a pair of laterally spaced, integral projections 58 and 59 at its back end for receiving the rear guide rod 55. Each of these projections 56-—59 on the horizontal slide block 49 preferably carried antifriction bearings (not shown) engaging the respective fixed guide rods 54 and 55.

As best seen in FIG. 7, the horizontal slide block 49 has a centrally located opening 60 which is generally rectangular in outline. On either side laterally of this opening the horizontal slide block 49 carries a pair of cam follower rollers 61 and 62. These rollers are mounted on respective pins 63 and 64 which extend down from the horizontal slide block 49.

The cam follower rollers 61, 62 on the horizontal slide block 49 are engaged by a horizontal displacement cam 65 attached to a rotary drive shaft 66. As shown in FIG. 3, this drive shaft 66 is driven from an electric motor 67 through reduction gearing 68. The drive shaft 66 is rotatably supported by an antifriction bearing assembly 69 fixedly mounted in an opening 70 in an upwardly-inclined plate 71 attached to the frame of the machine. With the rotational axis of the shaft 66 fixedly positioned in this manner, the shape of the horizontal displacement cam 65 is such that it displaces the horizontal slide block 49 intermittently to the right and then back to the left once for each rotation of the shaft 66. This horizontal displacement imparted to the slide block 49 by cam 65 extends through a distance equal to the lateral spacing between two successive stations (e.g., 1 and 2, or 2 and 3) of the machine.

Shaft 66 carries a cam drum 117 having several cams which operate respective switches in the control circuits for the reject mechanisms at the reject stations 3, 5 and 7, as explained hereinafter.

Referring to FIG. 6, the transfer mechanism also has a vertical slide assembly which includes a pair of upper and lower, parallel, laterally extending, connecting rods 72 and 73, which are rigidly attached by respective connecting pieces 74, 75, 76 and 77 to the rods 47 and 48 which carry the transfer plate 44. A slide block 78, which extends above and parallel to the horizontal slide block 49, is slidably mounted on the lateral connecting rods 72 and 73 by suitable antifriction bearings (not shown). This slide block 78 will be referred to as the "vertical" slide block because it determines the up and down displacements of the transfer plate 44, toward and away from the machine stations.

A pair of cam follower rollers 79 and 80 are mounted on respective pins 81 and 82 extending down from the vertical slide block 78. These cam follower rollers engage the opposite sides of a vertical displacement cam 83 attached to the rotary drive shaft 66.

With this arrangement, as the drive shaft 66 rotates, its cam 83 displaces the vertical slide block 78 intermittently toward and away from the machine stations, and this movement is imparted through the lateral connecting rods 72 and 73 to the rods 47 and 48 which carry the transfer plate 44.

As shown in FIGS. 5 and 6, the vertical displacement cam 83 is substantially smaller than the horizontal displacement cam 65, so that the vertical displacements of the transfer plate 44 toward and away from the machine stations are substantially shorter than its horizontal displacements between successive machine stations. Preferably the ratio of horizontal to vertical displacement magnitudes is about 3 to 1, as indicated in FIG. 8 which shows the path of movement of the transfer plate 44. Starting from a retracted position 84 the transfer plate moves directly toward the machine stations to position 85, where the recesses A—G in the front of the transfer plate engage the nuts, and then the transfer plate moves horizontally from left to right to position 86 (through a distance equal to the lateral spacing between neighboring machine stations) so as to carry the nuts to the next machine stations, and then the transfer plate is retracted directly away from the machine stations to position 87 (in which it is disengaged from the nuts), and then it is moved laterally from right to left back to retracted position 84.

This movement of the transfer plate along a rectangular path takes place cyclically in a repetitive fashion. During each cycle of rectangular movement of the transfer plate, the nuts are in motion only during the left to right lateral movement of the transfer plate from point 85 to point 86. During essentially the rest of the cycle, the transfer plate is disengaged from the nuts and the nuts at the inspection stations 2, 4 and 6 are stationary, as required by the inspection operations.

From FIG. 5 it will be apparent that the maximum radius segment of the horizontal displacement cam 65 (between points 65a and 65b on its periphery) engages the right-hand roller 62 for 90° of rotation of shaft 66, and 90° later, it engages the left-hand roller 61 for another 90° of the shaft rotation. In between these two quarter-turns of the shaft 66, the maximum radius segment of the vertical displacement cam 83 (between points 83a and 83b on its periphery) engages the lower roller 80 for 90° of the rotation of shaft 66, and 90° later, it engages the upper roller 79 for another 90° of the shaft rotation.

Consequently, the nuts are being moved from one station to the next station only during one-quarter of each cycle of the transfer mechanism. Allowing a few additional degrees at the beginning and end of each lateral left to right movement of the transfer plate 44, during which it is not completely disengaged from the nuts and the nuts are not completely at rest, this still leaves more than 70 percent of the time during which the nuts are stabilized at rest. This is advantageous in that the inspection operations at stations 2, 4 and 6 can be taking place 70 percent of the time, and the transfer of the nuts between stations takes up less than 30 percent of the time.

EDDY CURRENT SCANNING AND REJECT STATIONS

Figure 2:
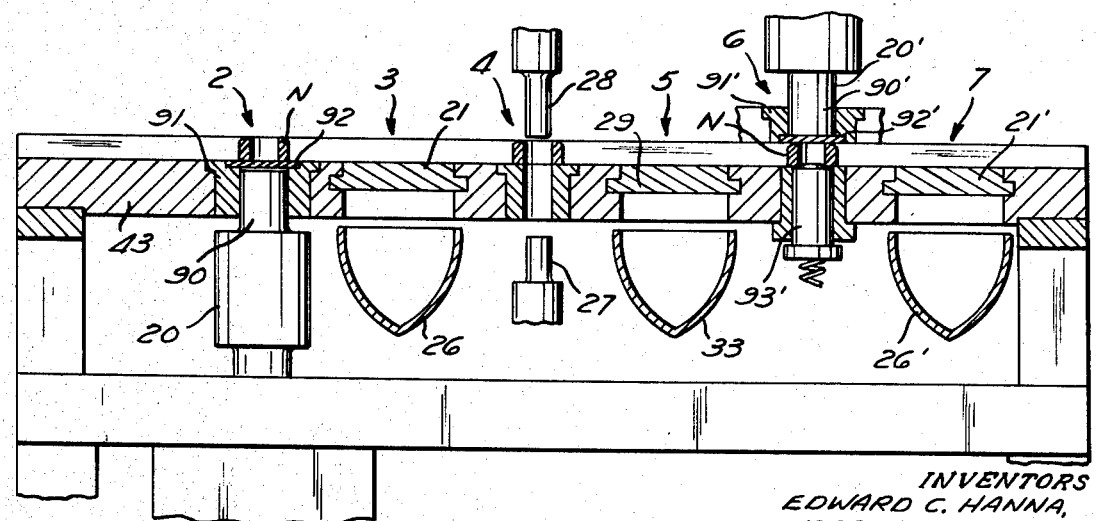
FIG. 2 is a view taken generally along the line 2–2 in FIG. 1 and showing in greater detail the successive inspection and reject stations in this apparatus.

Referring to FIGS. 1, 2 and 9, the first inspection station (station 2) has an eddy current scanner 20 of known design having a motor-driven probe 90 which projects up through a flanged bushing 91 carried by the fixed shelf 43. This bushing supports a thin, flat dielectric window 92 whose top face is coplanar with the top surface of the shelf 43. The nut N to be scanned in this station rests directly on top of this dielectric window 92. A spring-pressed pin 93 (FIG. 9) bears down against the top of this nut with just enough force to hold it snugly against the dielectric window 92.

The eddy current probe 90 (FIG. 10) of the scanner may be of known construction, having a pair of spaced, parallel, upwardly-extending magnetizable rods 94 and 95, which are offset radially the same distance from the axis of rotation of the probe, and respective windings 96 and 97 on these rods. The outer ends of these rods revolve in succession along a circular path spaced a very short distance below the dielectric window 92, directly opposite the dashed line 98 shown on the bottom end face of the nut N in FIG. 10. The probe coils 96 and 97 are connected respectively across respective secondary windings 99 and 100 of a pair of rotary transformers 101 and 102. These secondary windings are mounted on the same rotary shaft 103 as the probe 90 so that they rotate in unison with the probe. The rotary transformers have respective stationary primary windings 104 and 105 which are inductively coupled to the secondary windings.

The primary windings are connected in series with each other to a suitable oscillator (not shown). The oscillator energizes the probe windings 96 and 97 through the respective rotary transformers 101 and 102, and each coil produces a time-varying localized magnetic field adjacent the outer end of the respective rod 94 and 95 as these rods revolve in succession along the circular path indicated by the dashed line 98 on the nut N being scanned. These magnetic fields induce localized eddy currents which circulate in closed paths in the nut N which is then resting on the dielectric window 92 in position to be scanned. The localized areas or spots where these eddy currents are present in the nut are designated by the shaded areas X and Y in FIG. 10, which are located directly opposite the respective rods 94 and 95 on the probe 90. Each of these localized eddy current regions is revolved along the annular extend of the bottom face of the nut N as the probe 90 rotates.

The probe senses the eddy currents in the nut being scanned in the following manner:

A discontinuity in the nut N, such as a crack or other flaw in or close to the bottom end face resting on the dielectric window 92 just above the probe, will alter the paths of the eddy currents induced by the probe coil 96 or 97 which is then directly opposite this discontinuity. The discontinuity presents a high resistance barrier which tends to cause the eddy currents to be diverted away from the discontinuity. When this happens, it produces a change in the impedance of the probe coil 96 or 97 which is then directly opposite the discontinuity.

Consequently, a flaw in the nut will momentarily affect the impedance of the probe coil 96 which first revolves past it and then it will momentarily affect the impedance of the next probe coil 97 when the latter revolves past the flaw. These momentary, time-displaced impedance changes in the probe coils 96 and 97 are sensed by a control circuit 106 (FIG. 1) in the scanner to produce a differential probe signal which controls the display provided by an oscilloscope and also operates defect-detecting circuitry for purposes explained hereinafter. The details of this circuitry are omitted as unnecessary to an understanding of the present invention.

While the probe 90 rotates continuously, it is automatically disabled from operating the defect-detecting circuitry during that portion of each cycle while the transfer mechanism is transferring the articles from one station to the next. To this end, the drive shaft 66 of the transfer mechanism has a cam C-9 (FIG. 3) on the cam drum 117 which operates a switch S-9. Switch S-9 is in its normally-open condition from 235° to 100° rotational position of shaft 66 to prevent the probe's output signal from being effective at this time. From 100° to 235°, cam C-9 holds switch S-9 closed to enable the probe to operate the defect-detecting circuitry.

Various eddy current flaw detection machines are available, such as the Series DD-60 dynamic defectometer sold by Automation Forster, subsidiary of Automation Industries, Inc., Ann Arbor, Michigan. The particular flaw detector partially depicted schematically in FIG. 10 is merely illustrative of one type suitable for use in the present invention.

Referring to FIG. 1, the control circuit 106 associated with the scanner has a relay (not shown) which has a set of normally-open contacts 107 which are closed in response to the detection of a flaw in the nut N being scanned in station 2. Therefore, if a flaw is detected in the nut N at station 2 during one cycle of operation of the transfer mechanism, the contacts 107 will close to initiate the operation of a control circuit which causes this flawed nut to be rejected after it has been moved over to station 3 by the transfer mechanism in the next cycle of operation.

Figure 13:
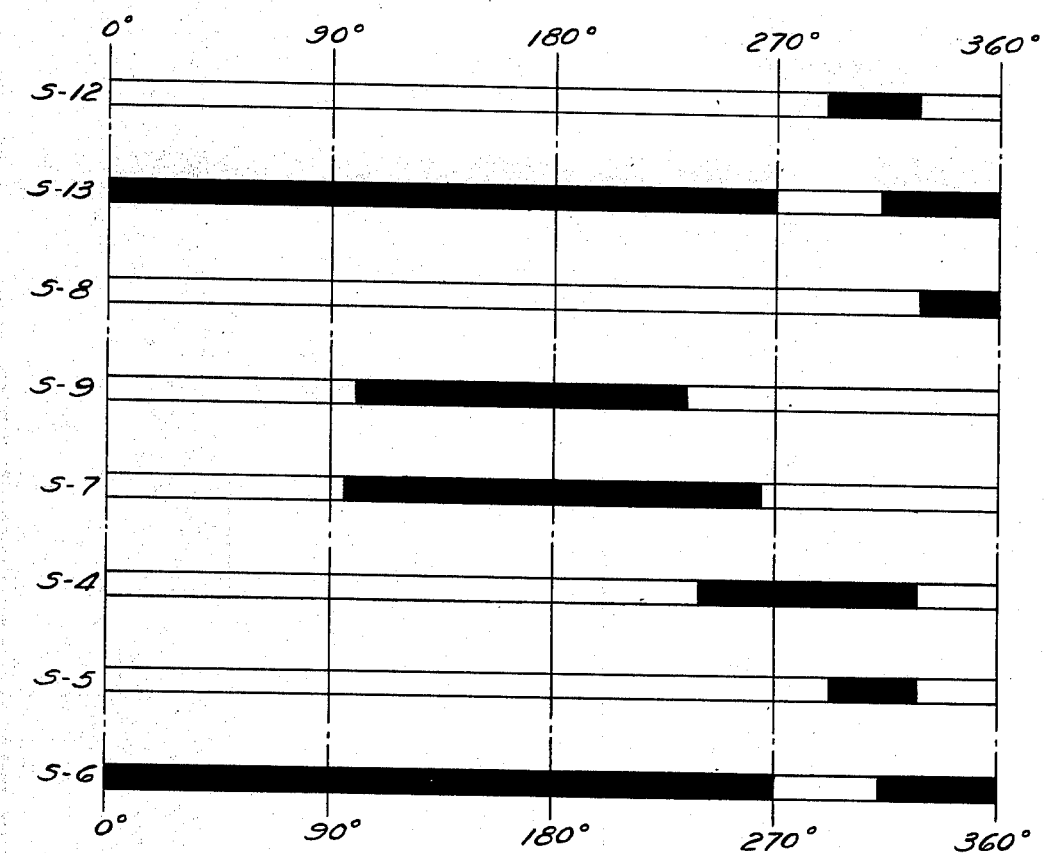
FIG. 13 is a timing chart for the cam-operated switches in the present apparatus.

The contacts 107, when closed in this manner, remain closed while a switch S-12 is closed by cam C-12 on cam drum 117 (FIG. 3). Cam switch S-12 and relay contacts 107 are connected in series with a relay coil 108 across a pair of power supply lines L1 and L2. Switch S-12 is closed from 295° to 330° of each rotation of shaft 66, as shown by the timing chart of FIG. 3, which is long enough to initially energize the relay coil 108, which then closes its normally-open holding contacts 109. Following this, the relay contacts 107 and cam switch S-12 are restored to their respective normally-open conditions. The control circuit 106 of the scanner is restored to its normal condition, reopening switch 107, when a normally-open switch S-8 is closed by a cam C-8 on the cam drum from 335° to 360°, as shown in the timing chart of FIG. 13.

The holding contacts 109 are connected in series with relay coil 108 across these power supply lines through a normally-closed, cam-operated switch S-13. This switch S-13 is positioned to be opened by its cam C-13 on cam drum 117 (FIG. 3) at the 270° rotational position of shaft 66 and to reclose at 310°, as shown in the timing chart of FIG. 13.

Relay coil 108, when energized, also closes a second set of relay contacts 114, which are connected across the power lines L1 and L2 in series with a normally-open, cam-operated switch S-7 and the solenoid 24 of the solenoid valve 23 at the first reject station 3. A cam C-7 on the cam drum 117 carried by shaft 66 closes switch S-7 at 95°, shortly after the transfer plate 44 has passed point 86 in its cycle of movement (FIG. 8). Switch S-7 reopens at 265°, as shown in the timing chart of FIG. 13.

As shown in FIG. 3, the cams C-7 and C-13 are mounted on the cam drum 117 attached to shaft 66 below the transfer mechanism. The cam-operated switches S-7 and S-13 are fixedly mounted on an upwardly-inclined front panel 118 of the machine frame, in position to be engaged by the respective cams C-7 and C-13 as described.

In the operation of this circuitry, if no flaw has been detected in the nut scanned at station 2, the contacts 107 will remain open during that cycle of the transfer mechanism. Consequently, relay coil 108 will not be energized and, therefore, during the next cycle of the transfer mechanism, when this nut is at station 3, the valve solenoid 24 will not be energized.

However, if the eddy current scanner 20 has detected a flaw in the nut at station 2, the contacts 107 will be closed, energizing relay coil 108. Relay coil 108 then closes its holding contacts 109 and its contacts 114. The holding contacts 109 establish a relay holding circuit through the now-closed cam-operated switch S-13. Before switch S-13 is opened by its cam C-13 to break this holding circuit during the next cycle of operation, cam C-7 will have closed its switch S-7 to energize the valve solenoid 24 through the now-closed relay contacts 114. In the meantime, contacts 107 will have re-opened, so that when cam C-13 now opens switch S-13 the relay coil 108 will be deenergized, opening its contacts 114 to break the energization circuit for the valve solenoid 24.

As shown in FIG. 1, the solenoid valve 23 has an inlet port 120 connected to a pressurized air supply 121, an outlet port 122 leading to the atmosphere, and a port 123 connected to the front end of the cylinder 124 in the cylinder and piston unit 22. The piston 125 in this cylinder has a piston rod 126 extending through the front end of the cylinder and coupled to the reciprocable trap door 21. A coil spring 127 in the back end of the cylinder normally biases the piston 125 forwardly to the position shown in FIG. 1, in which the trap door 21 supports the nut. This condition prevails as long as the valve solenoid 24 is deenergized, at which time the air inlet port 120 is blocked and port 123 is connected to port 122, so as to vent the front end of cylinder 124 to the atmosphere.

When the valve solenoid 24 is energized, it actuates valve 23 to a position in which its atmosphere port 122 is blocked and its air inlet port 120 is connected to the port 123 leading to the front end of the cylinder. When this happens, the pressurized air introduced into the front end of the cylinder retracts the piston 125, which retracts the trap door 21, to drop the nut down into the reject chute 26.

As already indicated, the valve solenoid 24 is thus energized to reject the nut in station 3 only if that nut had been determined to be defective by the eddy current scanner 20 in the immediately preceding inspection station (station 2).

The eddy current scanner at station 6 and the associated reject mechanism at station 7 are essentially identical to the just-described arrangements at stations 2 and 3, except that in station 6 the vertical positions of the parts are reversed, so that the scanner 20' scans the top of the nut. Corresponding elements at stations 6 and 7 are given the same reference numerals as those used for the elements at stations 2 and 3, but with a "prime" subscript added. The detailed description of these elements will not be repeated. The probe in this scanner is effectively disabled by the same cam-operated switch S-9 while the articles are being transferred from one station to the next.

The control circuit for the reject solenoid 24' at station 7 includes the same cam-operated switches S-13 and S-7 as the control circuit for the reject solenoid 24 at station 3.

MECHANICAL PROBE AND REJECT STATIONS

Figure 12:
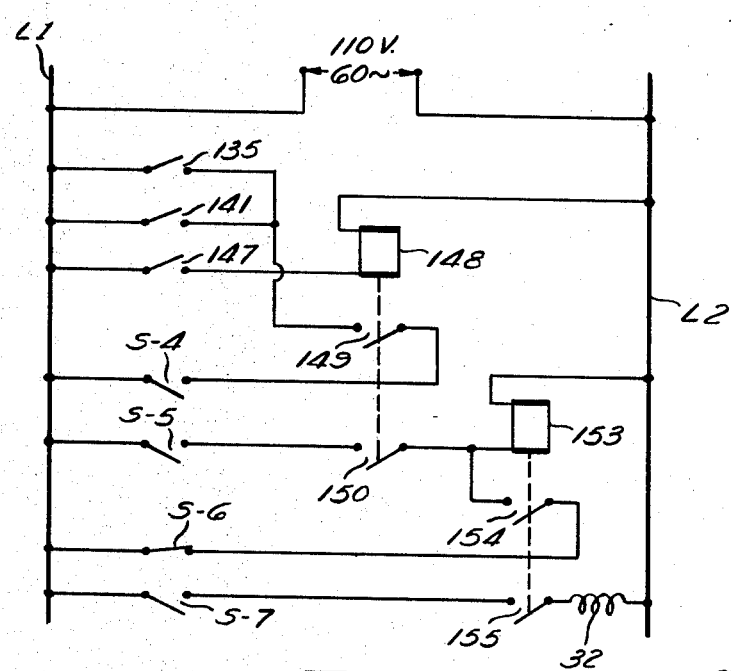
FIG. 12 is a schematic electrical circuit diagram showing the control circuit for the reject mechanism which is operated by the probes in FIG. 11.

The probe assembly at station 4 is shown in greater detail in FIG. 11 and the control circuit for the reject mechanism at station 5, which is controlled by the probe assembly at station 4, is shown in FIG. 12.

Referring to FIG. 11, the specific probe assembly shown there is intended for detecting flaws in a known type of locknut N which has a smaller thread diameter near its crown face (the upper end face in FIG. 11) than its thread diameter near its washer face (the lower end face in FIG. 11). However, it is to be understood that the probe assembly may be modified for use with other types of annular articles to be inspected.

Referring to FIG. 11, the upper probe 28 at station 4 is a cylindrical plug gauge having a beveled, annular marginal edge 130 at its lower end. The cylindrical diameter of this plug gauge is larger than the minor diameter of the upper end of a properly formed threaded opening 131 in the nut N, so that when the plug gauge is lowered into this opening it does not pass downward beyond the first thread at the upper end of this opening. The threads at the upper end of the tapped opening are made smaller in diameter than the threads at the rest of the opening to provide the desired lock-nut characteristics.

The upper plug gauge 28 is urged downward by a spring 132 acting between its upper end and a fixed part 133 of the machine frame. The upper plug gauge 28 is normally held retracted upward against this spring by a rotary cam (not shown) which acts against a cam follower attached to a holder 134 for the gauge. This cam is driven from the aforementioned drive shaft 66 for the transfer mechanism such that once each cycle of movement of the transfer mechanism, at about 100° position when the nuts are at rest in their new positions, this cam releases the upper plug gauge 28 to be moved downward by spring 132 into the upper end of the opening 131 in the nut, as shown in FIG. 11. The plug gauge 28 is fully inserted at 210° and it remains at rest in that position until 250°. The withdrawal of plug gauge begins at 250° and is completed by 355°, before the transfer mechanism engages the nuts and moves them from left to right (from point 85 to point 86 in FIG. 8) from one station to the next. Such withdrawal is performed by the cam which retracts the upper plug gauge 28 upwardly against the urging of spring 132 to a position in which it is completely disengaged from the nut. The cam holds gauge 28 in this upwardly-retracted position until the next 100° position, at which time the next nut has been advanced into station 4 and has been released by the transfer mechanism.

A normally-open, snap-acting limit switch 135 is fixedly positioned to be operated by a screw 136 adjustably mounted on the holder 134 by a nut 137. Normally, i.e., if the upper end of the tapped opening 131 in the nut is properly formed, the screw will not reach the plunger of switch 135 when the upper plug gauge 28 is moved down against the nut being inspected. However, if the nut is defective because of a failure to provide a small enough thread diameter at its upper end or because of a stripping or reaming out of the screw threads at its upper end, the upper plug gauge 28 will move down into the opening 131 an excessive amount, enough for the screw to close the limit switch 135.

The lower probe 27 is a two-diameter, stepped plug gauge, having a smaller diameter, cylindrical, upper end segment 138 and a larger diameter, cylindrical segment 139 just below the upper end segment 138. The upper end segment 138 is dimensioned to have a snug sliding fit in the lower end of a properly tapped opening 131 in the nut N being inspected. The larger diameter segment 139 of the lower plug gauge is slightly larger than the minor diameter of a properly tapped opening 131 in the nut, so that this segment 139 should not pass beyond the lowermost thread in this opening when gauge 27 is moved upward.

The lower plug gauge 27 is operated by a spring 140 and a cam (not shown) in the same manner as the spring and cam arrangement for the upper plug gauge 28, and the upper and lower plug gauges are moved simultaneously toward and away from the nut N in station 4.

A normally-open limit switch 141 is positioned to be operated by a screw 142 carried by the holder 143 for the lower plug gauge 27 if the latter moves too far up into the opening 131 in the nut being inspected. This can happen if the minor diameter of the nut opening 131 at its lower end is oversized or if the screw threads at this opening have been stripped or reamed out. If, however, the tapped opening 131 in the nut N is properly formed the limit switch 141 will not be operated.

The lower plug gauge 27 has an air passage 143 connected to a pair of openings 144 and 145 which are circumferentially spaced 90° apart on the periphery of its upper end segment 138. This air passage is connected through an air hose 146 to a suitable pressurized air source (not shown). A normally-open pressure switch 147 is connected to this air hose just ahead of the air passage 143 in the lower plug gauge.

In the operation of the lower plug gauge, if the threaded opening 131 in the nut has been tapped, the pressurized air in the plug gauge air passage 143 can escape to the atmosphere along the threaded groove in nut N and the pressure in hose 146 will be insufficient to close the pressure switch 147. However, if the nut has not been tapped, this plug gauge air passage 143 will be substantially blocked and the resultant back pressure in hose 146 will close the pressure switch 147.

Referring to FIG. 12, the three switches 135, 141 and 147 associated with the probe assembly are connected in parallel with each other and in series with a relay coil 148 across power supply lines L1 and L2. Closing of any one of the switches 135, 141 and 147 will complete the energization circuit for relay coil 148. Such energization of relay coil 148 causes its normally-open contacts 149 and 150 to close.

Contacts 149 are holding contacts which, after being closed by the initial energization of relay coil 148 following the closing of any one of switches 135, 141 and 147, complete a holding circuit for relay coil 148 through the normally-open, cam-operated switch S-4. As shown in the timing chart of FIG. 13, switch S-4 is positioned to be closed by its cam C-4 on the motor driven cam drum 117 (FIG. 3) at the 240° position of the latter during each cycle of movement of the transfer mechanism and to reopen at 330°.

The other set of relay contacts 150 is connected in series with a normally-open switch S-5 and a second relay coil 153 across the power supply lines L1 and L2. Switch S-5 is positioned to be closed by its cam C-5 on the cam drum 117 (FIG. 3) at the 295° position of the latter during each cycle of movement of the transfer mechanism and to reclose at 330°.

With relay contacts 150 closed, the closing of switch S-5 completes an initial energization circuit for a second relay coil 153. When this happens, relay coil 153 closes its normally-open contacts 154 and 155.

Contacts 154 provide a holding circuit for relay coil 153 through a normally-closed switch S-6, which is positioned to be opened momentarily by its cam C-6 on the cam drum 117 (FIG. 3) at the 270° position of the latter during each cycle of movement of the transfer mechanism and to reclose at 310°.

Relay contacts 155 are connected in series with a normally-open, cam-operated switch S-7 and a valve solenoid 32 across the power supply lines L1 and L2. Switch S-7 is positioned to be closed by its cam C-7 on the cam drum 117 at the latter's 95° position during each cycle of movement of the transfer mechanism and to reopen at 265°.

Referring to FIG. 1, at station 5 the reciprocable trap door 29 of the reject mechanism is operated by an air cylinder and piston unit 30 under the control of a solenoid valve 31 in the same manner as described in detail for the reject mechanism at station 3. The solenoid 32 of valve 31 is energized during a cycle of movement of the transfer mechanism in the event that any one or more of the switches 135, 141 and 147 were closed in the preceding cycle, as described. Closing of any one of these switches energizes relay coil 148 which, in turn, energizes relay coil 153 when the cam-operated switch S-5 is closed. Relay coil 153 closes its contacts 155 so that, when the cam-operated switch S-7 is closed, the valve solenoid 32 will be energized long enough to cause valve 31 to actuate the cylinder and piston unit 30 to move the trap door 29 to drop the nut N into the reject chute 33 at station 5.

In the operation of the plug gauge probes 27 and 28 at station 4 and the reject mechanism at station 5, let it be assumed that a nut in station 4 has been determined to be defective by either or both probes 27 and 28, so that one or more of the switches 135, 141 and 147 has been closed. Closing of this switch has energized relay coil 148, which has energized relay coil 153.

After the probes 27, 28 have been fully retracted, the transfer mechanism will be in position 85 of FIG. 8, ready to move the defective nut from probe station 4 over to reject station 5 (position 86 in FIG. 8). At this instant, relay coil 153 is held energized through its now-closed holding contacts 154 and the normally-closed, cam-operated switch S-6. At this same instant, which is the 0° rotational position of shaft 66, all of the cam-operated switches S-4, S-5, S-6 and S-7 have returned to their normal positions, as shown in FIG. 12. Relay 148 will have been deenergized by the preceding opening of cam-operated switch S-4. Switches 135, 141 and 147 are in their normal, open positions because of the withdrawal of the probes 27 and 28.

At the 90° rotational position of shaft 66 (position 86 of the transfer mechanism in FIG. 8) the defective nut has been transferred from station 4 to station 5, and the following nut has been transferred from station 3 to station 4.

At the 95° rotational position of shaft 66 the transfer plate 44 will have been retracted enough to be completely disengaged from the nuts. At this instant switch S-7 is closed by its cam C-7 to complete the energization circuit for the valve solenoid 32, which operates the reject mechanism at station 5 to reject the nut which was found to be defective in station 4. Also, at this 95° position the probes 27, 28 in station 4 start to move into the new nut positioned there.

Between 100° and 250° of the shaft rotation, one of the switches 135, 141 or 147 at the probe station 4 will be closed if the nut at station 4 is defective in any of the particulars already indicated. If no such defect is found by the probes, the relay coil 148 will not be energized during this cycle of movement of the transfer mechanism and the reject mechanism at station 5 will not be operated during the next cycle, so that in the following cycle the nut will be advanced to station 6.

However, if one of the switches 135, 141 or 147 at station 4 is closed due to a defect in the nut, relay coil 148 will be energized and it will complete a holding circuit for itself when the cam-operated switch S-4 is closed (at 240°).

At the 265° rotational position of shaft 66, switch S-7 is opened by its cam to deenergize the valve solenoid 32. The reject shutter or trap door 29 in station 5 is moved to its closed position by the cylinder and piston unit 30. Switch S-7 remains open until the shaft reaches the 95° position in the next cycle of movement of the transfer mechanism.

At 270°, switch S-6 is opened momentarily by its cam C-6 to deenergize the second relay coil 153. Switch S-6 is reclosed at 310°.

At 290°, switch S-5 is closed by its cam C-5 to energize relay coil 153, provided relay coil 148 is energized to maintain its contacts 150 closed. Relay coil 153 then completes a holding circuit for itself by closing its holding contacts 154, so that the reopening of switch S-5 at 330° does not affect the continued energization of relay coil 153.

At 330°, switch S-4 is opened momentarily by its cam to deenergize the first relay coil 148, so as to put the latter under the control of switches 135, 141 and 147 for the next cycle of movement of the transfer mechanism.

With the second relay coil 153 new energized, its now-closed contacts 155 arm the valve solenoid 32 so that the closing of switch S-7, at the 95° position of the next cycle, energizes the valve solenoid to operate the reject mechanism at station 5.

In this manner, the defect signal originating in station 4, by the operation of one of the switches there, initiates the operation of the FIG. 12 control circuit so that when this defective nut is transferred to station 5 the reject mechanism there will discharge it into the reject chute 33.

From the foregoing it will be evident that the illustrated apparatus is particularly well-adapted for carrying out all of the objectives of the present invention in a novel and advantageous manner. However, while a presently-preferred apparatus has been shown and described, it is to be understood that various modifications, omissions and adaptations which depart from the disclosed embodiment may be adopted without departing from the scope of the present invention. For example, where a less complete inspection is appropriate, the mechanical probe inspection may be omitted, or it may be modified in accordance with the desired dimensional characteristics of the particular type of article being inspected.

We claim:

1. An apparatus for inspecting electrically-conductive annular articles comprising:
   a transfer mechanism for intermittently moving the articles individually in succession to spaced, successive inspection stations and to a respective reject station after each inspection station;
   a first eddy current scanner at one of said inspection stations for scanning the article thereat from one axial side while the article is stationary to detect flaws at or near the adjacent end face of the article;
   a first reject mechanism at the reject station immediately following said one inspection station operable in response to the detection of a flaw in the article by said first scanner for rejecting the flawed article when it arrives at said reject station;
   a second eddy current scanner at another of said inspection stations for scanning the article thereat from the opposite axial side while the article is stationary to detect flaws in the article at or near the adjacent opposite end face of the article; and
   a second reject mechanism at the reject station immediately following said last-mentioned inspection station operable in response to the detection of a flaw in the article by said second scanner for rejecting the flawed article when it arrives at said last-mentioned reject station.

2. An inspection apparatus according to claim 1, wherein said transfer mechanism has a plurality of article-receiving recesses which are spaced apart in succession in accordance with the spacing between successive stations for engaging several articles simultaneously to move them individually from one station to the next.

3. An inspection apparatus according to claim 2, and further comprising means for moving said transfer mechanism along a four-sided path between successive corners of said path in which:
   a. the article-receiving recesses move into engagement with said articles at respective stations;
   b. the article-receiving recesses position the articles at the respective next stations;
   c. the article-receiving recesses are retracted away from the articles at said next stations; and
   d. the article-receiving recesses are positioned opposite the articles at said first-mentioned stations but retracted away from the articles.

4. An inspection apparatus according to claim 3, wherein said four-sided path is substantially rectangular and the article-receiving recesses are disengaged from the articles during most of the four-sided cycle of movement of the transfer mechanism.

5. An inspection apparatus according to claim 3, wherein said means for moving the transfer mechanism comprises first rotary cam means for moving said article-receiving recesses back and forth between successive stations, and second rotary cam means for moving said article-receiving recesses back and forth between article-engaging and retracted article-releasing positions during the intervals between their movements between the successive stations.

6. An inspection apparatus according to claim 1, and further comprising at each inspection station a thin dielectric window adjacent the eddy current scanner, and means for holding the article against said window.

7. An inspection apparatus according to claim 6, wherein said last-mentioned means comprises a spring-biased member at the opposite side of said window from the eddy current scanner.

8. An inspection apparatus according to claim 1, and further comprising probe means at an additional inspection station for sensing a dimensional flaw in the annular article at the opening therein.

9. An inspection apparatus according to claim 8, and further comprising: a reject mechanism at a reject station immediately following said last-mentioned inspection station, said last-mentioned reject mechanism being operable by said probe means in response to the detection of a defect in the article by said probe means for rejecting the defective article when it arrives at said last-mentioned reject station.

10. An inspection apparatus according to claim 9, wherein said probe means comprises a plug gauge at one axial side of the article at said last-mentioned inspection station, means for moving said plug gauge into the opening in the article from said one axial side of the article, and switch means positioned to be operated in response to excessive movement of the plug gauge into the opening due to an oversized opening, said switch means being connected to control the operation of the reject mechanism at the immediately following reject station.

11. Apparatus according to claim 10, wherein said plug gauge has an air passage for directing air against the wall of said opening in the article, and further comprising a pressure switch for sensing the air pressure in said passage to detect the absence of a threaded groove in said wall of the opening, said pressure switch being connected to control the operation of the reject mechanism at the immediately following reject station.

12. An inspection apparatus according to claim 9, wherein said probe means comprises a pair of plug gauges located respectively on opposite axial sides of the article at said last-mentioned inspection station, means for moving said plug gauges into the opening from said opposite axial sides of the article, and a pair of switches positioned to be operated respectively in response to excessive movement of the corresponding plug gauge into the opening, each of said switches being connected to control the operation of the reject mechanism at the immediately following reject station.

13. Apparatus according to claim 12, wherein one of said plug gauges has an air passage for directing air against the wall of the opening in the article, and further comprising a pressure switch connected to sense the air pressure in said passage to detect the absence of a threaded groove in said wall of the opening, said pressure switch being connected to control the operation of the reject mechanism at the immediately following reject station.

14. In an article processing machine having a plurality of successive spaced stations, a transfer mechanism including a transfer plate having a plurality of article-engaging recesses which are spaced apart in succession in accordance with the spacing between the successive stations, a first slide block supporting said transfer plate for movement laterally back and forth between successive stations, a second slide block supporting said transfer plate for movement transverse to said lateral movement back and forth toward and away from the stations, first rotary cam means for displacing said first slide block laterally back and forth alternately at intervals spaced apart during each rotation of said first cam means, and second rotary cam means for displacing said second slide block transverse to said lateral movement between said intervals of the lateral movement.

15. A machine according to claim 14, wherein said transfer plate is disengaged from the articles throughout substantially the entire cycle of its movement except while moving said recesses laterally from one station to the next.

16. A machine according to claim 15, wherein said first and second cam means and said first and second slide blocks impart a substantially rectangular cycle of movement to the transfer plate.

17. An apparatus according to claim 14, wherein said first and second blocks and said first and second cam means move said transfer plate along a four-sided path having successive corners in which:
a. the article-receiving recesses engage the articles at respective stations;
b. the article-receiving recesses position the articles at the respective next stations;
c. the article-receiving recesses are retracted away from the articles at said next stations; and
d. the article-receiving recesses are positioned opposite the articles at said first-mentioned stations but retracted away from the articles.

18. In an apparatus for inspecting annular articles, means for intermittently moving successive articles individually to an inspection station and from there to a reject station, a plug gauge at said inspection station, means for moving said plug gauge into the opening in the article from one axial side of the article, switch means positioned to be operated in response to excessive movement of the plug gauge into the opening, a reject mechanism at said reject station connected for operation by said switch to reject the defective article when it arrives at said reject station, said plug gauge having an end portion shaped and dimensioned to extend snugly into the opening in the article and an air passage terminating at said end portion for directing air against the wall of said opening in the article, and a pressure switch connected to sense the air pressure in said passage to detect the absence of a threaded groove in said wall of the opening, said pressure switch being connected to said reject mechanism to operate the latter when the defective article arrives at said reject station.

19. An apparatus according to claim 18, wherein said plug gauge has an additional portion extending rearwardly from said end portion and shaped and dimensioned to abut against the outermost thread on the wall of said opening in a correctly formed article to prevent the operation of said switch.

20. In an apparatus for inspecting annular articles, means for intermittently moving successive articles individually to an inspection station and from there to a reject station, a plug gauge at said inspection station, means for moving said plug gauge into the opening in the article from one axial side of the article, switch means positioned to be operated in response to excessive movement of the plug gauge into the opening, a reject mechanism at said reject station connected for operation by said switch to reject the defective article when it arrives at said reject station, an additional plug gauge at said inspection station, means for moving said additional plug gauge into the opening in the article from the opposite axial side of the article, and additional switch means positioned to be operated in response to excessive movement of said additional plug gauge into said opening, said additional switch means being connected to said reject mechanism to operate the latter when the defective article arrives at said reject station.

21. An apparatus according to claim 20, wherein said first-mentioned plug gauge has an end portion shaped and dimensioned to extend snugly into the opening in the article and has an air passage terminating at said end portion for directing air against the wall of said opening in the article, and further comprising a pressure switch connected to sense the air pressure in said passage to detect the absence of a threaded groove in said wall of the opening, said pressure switch being connected to said reject mechanism to operate the latter when the defective article arrives at said reject station.

22. A method of inspecting electrically-conductive annular articles having opposite end faces which comprises the steps of separately scanning each end face of the article with an eddy current probe that revolves annularly past the respective end face of the article while the article is stationary, and during such scanning sensing the eddy currents induced in the article to detect flaws in the article at or near the end face being scanned.

23. A method of inspecting electrically-conductive annular articles having opposite end faces comprising the steps of:
positioning the article stationary with one of said end faces in a predetermined position, generating opposite said one end face a localized time-varying magnetic field and revolving said magnetic field annularly along said one end face to induce corresponding localized eddy currents in the article thereat, and sensing said eddy currents to detect flaws in the article at or near said end face; and positioning the article stationary with its opposite end face in a predetermined position, generating opposite said last-mentioned end face a time-varying magnetic field and revolving said last-mentioned magnetic field annularly along said last-mentioned end face to induce localized eddy currents in the article thereat, and sensing said last-mentioned eddy currents to detect flaws in the article at or near said last-mentioned end face.

24. A method according to claim 23, and further comprising the steps of:
transferring the article to a reject station, following the sensing of the induced eddy currents therein; and
controlling the operation of a reject mechanism at said reject station in accordance with the eddy current sensing for that same article which took place before the article was transferred to the reject station.

25. A method of inspecting a series of electrically-conductive annular articles, each having opposite end faces, which comprises the steps of:
simultaneously positioning several articles individually at successive stations, including a first eddy current inspection station, a reject station following said first eddy current inspection station, a second eddy current inspection station, and a reject station following said second eddy current inspection station; and simultaneously advancing several articles individually from one station to the next intermittently;
in said first eddy current inspection station positioning the article stationary with one end face engaging one side of a thin dielectric window, generating on the opposite side of said window in close proximity to said one end face of the article a localized time-varying magnetic field and revolving said field annularly along said one end face of the article to induce corresponding localized eddy currents in the article, and sensing said eddy currents to detect flaws in the article at or near said one end face;
in the reject station following said first eddy current inspection station, controlling the acceptance or rejection of the article in accordance with the eddy current sensing which took place for that same article in the preceding first eddy current inspection station;
in said second eddy current inspection station, positioning the article stationary with its opposite end face engaging one side of a thin dielectric window, generating on the opposite side of said last-mentioned window in close proximity to said opposite end face of the article a localized time-varying magnetic field and revolving said field annularly along said opposite end face of the article to induce corresponding localized eddy currents in the article, and sensing said last-mentioned eddy currents to detect flaws in the article at or near said opposite end face; and
in the reject station following said second eddy current inspection station, controlling the acceptance or rejection of the article in accordance with the eddy current sensing which took place for that same article in the preceding second eddy current inspection station.

26. An apparatus for inspecting electrically-conductive annular articles comprising:
a transfer mechanism for intermittently moving the articles individually in succession to spaced, successive inspection stations and to a respective reject station after each inspection station, said transfer mechanism including a transfer plate having a plurality of article-engaging recesses which are spaced apart in succession in accordance with the spacing between the successive stations, first cam-operated means for moving said transfer plate at spaced time intervals laterally back and forth between successive stations, second cam-operated means for moving said transfer plate transverse to said lateral movement back and forth toward and away from the stations between said intervals of the lateral movement;
a thin dielectric window at one of said inspection stations, means for holding the article with one of its end faces abutting against one side of said window, a first eddy current scanner at the opposite side of said window for scanning said one end face of the article to detect flaws at or near said one end face;
a first reject mechanism at the reject station immediately following said one inspection station operable in response to the detection of a flaw in the article by said first scanner for rejecting a flawed article when it arrives at said reject station;
a thin dielectric window at another of said inspection stations, means for holding the article with its opposite end face abutting against one side of said last-mentioned window, a second eddy current scanner at the opposite side of said last-mentioned window for scanning said opposite end face of the article to detect flaws at or near said opposite end face; and
a second reject mechanism at the reject station immediately following said last-mentioned inspection station operable in response to the detection of a flaw in the article by said second scanner for rejecting a flawed article when it arrives at said last-mentioned reject station.

27. An inspection apparatus according to claim 26, wherein said first and second cam-operated means move said transfer plate along a four-sided path having successive corners in which:
 a. the article-receiving recesses engage the articles at respective stations;
 b. the article-receiving recesses position the articles at the respective next stations;
 c. the article-receiving recesses are retracted away from the articles at said next stations; and
 d. the article-receiving recesses are positioned opposite the articles at said first-mentioned stations but retracted away from the articles.

28. An apparatus according to claim 26 and further comprising: a plug gauge at an additional inspection station, means for moving said plug gauge into the opening in the article from one axial side of the article, switch means positioned to be operated in response to excessive movement of the plug gauge into the opening, and a reject mechanism at an additional reject station immediately following said last-mentioned inspection station connected for operation by said switch to reject the defective article when it arrives at said last-mentioned reject station.

29. An apparatus according to claim 28, wherein said plug gauge has an end portion shaped and dimensioned to extend snugly into the opening in the article and has an air passage terminating at said end portion for directing air against the wall of said opening in the article, and further comprising a pressure switch connected to sense the air pressure in said passage to detect the absence of a threaded groove in said wall of the opening, said pressure switch being connected to said last-mentioned reject mechanism to operate the latter when the defective article arrives at said last-mentioned reject station.

30. An apparatus according to claim 29, wherein said plug gauge has an additional portion extending rearwardly from said end portion and shaped and dimensioned to abut against the outermost thread on the wall of said opening in a correctly formed article to prevent the operation of said switch.

31. An apparatus according to claim 30, and further comprising an additional plug gauge at said last-mentioned inspection station, means for moving said additional plug gauge into the opening in the article from the opposite axial side of the article, additional switch means positioned to be operated in response to excessive movement of said additional plug gauge into said opening, said additional switch means being connected to said last-mentioned reject mechanism to operate the latter when the defective article arrives at said last-mentioned reject station.

32. An apparatus for inspecting electrically-conductive annular articles comprising: a transfer mechanism for moving the articles individually in succession to spaced, successive inspection stations and to a respective reject station after each inspection station; a first electromagnetic scanner at one of said inspection stations for scanning the article thereat from one axial side while the article is stationary to detect flaws at or near the adjacent end face of the article; a first reject mechanism at the reject station immediately following said one inspection station operable in response to the detection of a flaw in the article by said first electromagnetic scanner for rejecting the flawed article when it arrives at said reject station; a second electromagnetic scanner at another of said inspection stations for scanning the article thereat from the opposite axial side while the article is stationary to detect flaws in the article at or near the adjacent opposite end face of the article; and a second reject mechanism at the reject station immediately following said last-mentioned inspection station operable in response to the detection of a flaw in the article by said second electromagnetic scanner for rejecting the flawed article when it arrives at said last-mentioned reject station.

33. The combination of claim 32 wherein said transfer mechanism includes article-engaging means operable to simultaneously position a first article at said one inspection station, a second article at said reject station immediately following said one inspection station, a third article at said other inspection station, and a fourth article at said reject station immediately following said other inspection station, said article engaging means being operable to advance at least said first and third articles to the reject stations after a time delay sufficient for a scanning of said first and third articles.

34. An inspection apparatus according to claim 32, and further comprising probe means at an additional inspection station for sensing a dimensional flaw in the annular article.

35. An inspection apparatus according to claim 32, and further comprising at each inspection station a thin dielectric window adjacent to the electromagnetic scanner associated with that station, and means for holding the article against said window to thereby position the article relative to the associated electromagnetic scanner.

36. In an apparatus for inspecting internally threaded articles, means for moving successive articles individually to an inspection station and from there to a reject station, an inspection member at said inspection station, means for moving said inspection member into an opening in the article from one axial side of the article, said inspection member having an end portion shaped and dimensioned to extend into the opening in the article and having an air passage terminating at said end portion for directing air against the wall of said opening in the article, a pressure switch connected to sense the air pressure in said passage to thereby detect the absence of a thread in the wall of said opening, and a reject mechanism at said reject station connected for operation by said pressure switch to reject any article lacking a thread in the wall of said opening when this defective article arrives at said reject station.